(12) United States Patent
Olsson et al.

(10) Patent No.: US 6,422,363 B1
(45) Date of Patent: Jul. 23, 2002

(54) MOTOR VEHICLE GEARBOX

(75) Inventors: Ronald Olsson, Savedalen; Sverker Alfredsson, Vastra Frolunda, both of (SE)

(73) Assignee: Volvo Lastvagner AB, Gothenburg (SE)

( * ) Notice: Subject to any disclaimer, the term of this patent is extended or adjusted under 35 U.S.C. 154(b) by 0 days.

(21) Appl. No.: 09/581,621
(22) PCT Filed: Dec. 15, 1998
(86) PCT No.: PCT/SE98/02307
§ 371 (c)(1), (2), (4) Date: Sep. 5, 2000
(87) PCT Pub. No.: WO99/34137
PCT Pub. Date: Jul. 8, 1999

(30) Foreign Application Priority Data

Dec. 15, 1997 (SE) .............................. 9704671-8

(51) Int. Cl.[7] ............................... B60K 41/22
(52) U.S. Cl. ....................................... 192/3.63
(58) Field of Search ............... 192/3.61, 3.62, 192/3.63; 74/483 K, 483 R, 336 R; 475/209

(56) References Cited

U.S. PATENT DOCUMENTS

| 3,589,483 A | * | 6/1971 | Smith ........................ 192/3.52 |
| 4,146,120 A | | 3/1979 | Stevens |
| 4,354,584 A | | 10/1982 | Reifinger et al. |
| 4,406,356 A | * | 9/1983 | Prince .................... 192/3.62 X |
| 4,449,416 A | * | 5/1984 | Huitema .................... 74/336 R |
| 4,516,669 A | * | 5/1985 | Bostrom ..................... 192/3.58 |
| 4,549,637 A | | 10/1985 | Huckler et al. |

FOREIGN PATENT DOCUMENTS

EP       0 030 349       6/1981

* cited by examiner

*Primary Examiner*—Rodney H. Bonck
(74) *Attorney, Agent, or Firm*—Young & Thompson

(57) ABSTRACT

Vehicle gearbox with a control shaft rotatably and axially displacebly mounted transversely to the axial direction of the vehicle gearbox, the rotational movement of the control shaft from a neutral position effecting, via motion-transmitting elements, engagement of a gear speed. A lock element cooperating with the control shaft is coordinated with a sensor sensing the position of a clutch connected to the gearbox, and locks the control shaft in the neutral position when the clutch pedal is not depressed.

7 Claims, 2 Drawing Sheets

MOTOR VEHICLE GEARBOX

BACKGROUND OF THE INVENTION

The present invention relates to a vehicle gearbox, comprising an input shaft mounted in a housing, at least one countershaft driven by the input shaft, a main shaft, pairwise interengaging gears supported by the countershaft and the main shaft, at least one gear in each pair being freely rotatably mounted on its shaft and lockable to said shaft by means of an engaging sleeve axially displaceably but non-rotatably mounted on said shaft, said engaging sleeve being coordinated with synchronizing arrangements, a shift control, the movement of which in one direction from a neutral position effects via motion transmitting elements, displacement of an engaging sleeve to an engagement position, and the movement of which from the neutral position in another direction effects displacement of another engaging sleeve to an engagement position, and lock means comprising a lock element with control means, which, during predetermined operating conditions, hold the lock element in a locked position, in which it impedes movement of the shift control.

It is previously known to provide a gearbox of the above described type, which has the main shaft coupled to a subsequent range gearbox of planetary type, for example, in accordance with SE 9306735-5, with locking means to prevent mis-shifting. A lock function which prevents sing in the basic gearbox from the initiation of shifting in the range gearbox until this shifting step has been completed, i.e. when the shift selector mechanism has returned to its rest position, uses a sensor which cooperates with the control cylinder of the range gearbox and senses the position of its piston rod. When the driver preselects a new range (high to lower, low to high), the shifting is initiated by air being supplied to the control piston of the range gearbox, as soon as the gearbox shift lever reaches the neutral position. During initial movement of the control piston, a valve, under the influence of the sensor, directs compressed air to a control cylinder connected to a locking element. The control cylinder moves the locking element to a position in which it locks the control shaft in the neutral position. When the shifting in the range gearbox is completed, the control cylinder of the locking element is depressurized and spring means cooperating with the locking element move the locking element out of its locked engagement so that a new gear can be engaged in the basic gearbox.

Another locking function which prevents shifting from high range to low range at speeds above a predetermined speed, uses a speed sensor which controls a magnetic valve in the compressed air supply line to the control cylinder of the range gearbox. When the vehicle speed exceeds the predetermined speed limit, the magnetic valve closes and prevents compressed air supply to the control cylinder.

In gearboxes for heavy trucks, both those with and without a range gearbox with lockout function of the above described type, there are at times so-called servo-synchronizing devices. Such synchronizing devices use the rotational energy of the rotating components of the gearbox itself, to reduce the shift lever force required for the synchronizing work. In principle, shifting can occur after manual initiation of the synchronization (a light movement of the shift lever from the neutral position towards a gear speed position) completely by the action of the servo system. This involves, however, a risk. If a driver carelessly places his hand on the shift lever with the lever in the neutral position, the weight of the hand and part of the arm can be enough to move the lever to the synchronizing position without it being noticed. If the clutch pedal is depressed and the engine is disengaged from the gearbox, this will not be a problem because the shifting will be carried out normally. If, however, the clutch is not disengaged and the engine drives the input shaft of the gearbox, the synchronizing cones movable relative to each other will frictionally engage one another and soon be worn out, since it is not only the shafts, gears and discs in the gearbox which must be synchronized, but the entire engine.

SUMMARY OF THE INVENTION

The purpose of the present invention is in general to achieve a gearbox of the type described by way of introduction which is equipped so that unintended mis-shifting is made impossible, to thereby prevent initiation of the synchronizing work, especially in a gearbox with servo-synchronization, which can rapidly result in wearing out of the frictional surfaces of the synchronizing cones.

This is achieved according to the invention by virtue of the fact that the control means of the lock element comprise means which are affected by the position of a clutch pedal and which hold the lock element in the locked position when the clutch pedal is not actuated. This prevents shift lever movement from the neutral position as long as the clutch is engaged. Only after the clutch pedal has been depressed, which in practice is not done unintentionally, can the lever be moved from the neutral position for shifting. Therefore there does not have to be any risk of unconscious or unintentional initiation of the synchronizing work in a gearbox with servo-synchronization.

In a preferred embodiment of a gearbox according to the invention comprising a basic gearbox and a range gearbox and with a locking device which prevents shifting in the basic gearbox before the shifting in the range gearbox has been completed, uses a single locking device both for the locking function in the shifting in the range gearbox and for the locking function when the clutch is engaged. Instead of using, as in the previously known and described locking device, a single-acting control cylinder with spring means biasing the locking element in the direction away from the locking position, a double-acting piston cylinder device is used with spring means which bias the locking element towards the locked position. This guarantees the locking function in the neutral position even if there should occur a pressure failure in the vehicle compressed air system.

BRIEF DESCRIPTION OF THE DRAWINGS

The invention will be described in more detail with reference to examples shown in the accompanying drawings, where.

DETAILED DESCRIPTION OF THE PREFERRED EMBODIMENTS

Figure 1:
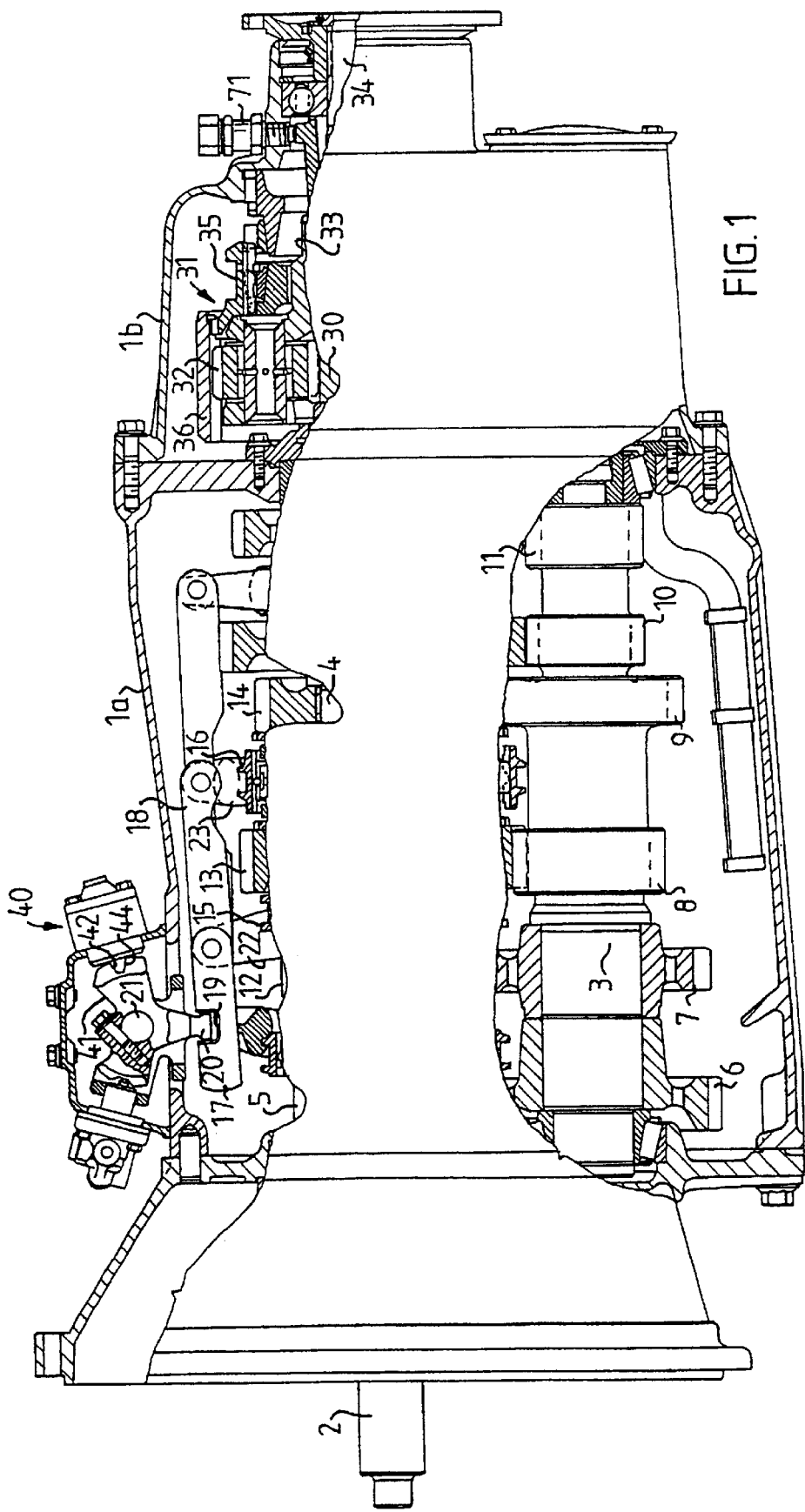
FIG. 1 shows a partially cut-away side view of a gearbox according to the invention with a basic gearbox and a range gearbox.

In FIG. 1, 1a designates the housing of a basic gearbox, in which an input shaft 2, a countershaft 3 and a main shaft 4 are mounted. The input shaft 2 drives the countershaft 3 via a pair of gears 5 and 6, respectively, fixed to the respective shafts. Five additional gears 7, 8, 9, 10 and 11 are fixed to the countershaft 3. The gears 7, 8 and 9 engage gears 12, 13 and 14 which are freely rotatably mounted on and lockable to the main shaft 4 with the aid of axially displaceable engaging sleeves 15 and 16, which cooperate with synchronizing devices of a type which is known per se and which are not shown in more detail here. These can, for example, be of the type shown and described in SE-A-502042, i.e. so-called servo-synchronizers. The first, second and third gear speeds, respectively, are obtained by locking the free gear 13, the free gear 14 or the free gear 12, respectively, onto the main shaft 4 by displacing the respective engaging sleeve 15, 16 with the aid of the gear selector mechanism of the gearbox. This selector mechanism comprises a pair of shifting rods 17, 18, each having a notch 19 into which a finger 20 on a control shaft 21 is insertable. The shifting rod 17 is pivotally joined to a shifting fork 22 pivotally mounted in the gearbox housing 1a, said shifting fork 22 engaging the engaging sleeve 15. The shifting rod 18 is pivotally joined to a shifting fork 23 mounted in the gearbox housing, and engages the engaging sleeve 16. The control shaft 21 is disposed transversally to the axial direction of the gearbox and is rotatable and displaceable in this direction. When the control shaft 21 is displaced axially, the finger 20 is moved laterally out of engagement with the notch 19 in a shifting rod 17 or 18 and into a corresponding notch in an adjacent shifting rod 18 or 17. By turning the control shaft 21, one or the other of the shifting rods is displaced, thereby displacing the associated shifting fork 22 or 23 to engage the first, second or third gear speed.

At an end of the main shaft 4 protruding from the housing 1a, there is fixed a sun gear 30 in a planetary gear set generally designated 31. The planetary gear set is enclosed in a housing 1b, screwed securely to the housing 1a. The sun gear 30 engages planet gears 32, which are carried on the planet gear carrier 33, which is solidly joined to an output shaft 34. With the aid of an axially displaceable engaging sleeve 35, a ring gear 36 engaging the planet gear 32 can be joined either to the housing 1b, thereby reducing (low range) the r.p.m. of the of the output shaft 34 relative to the r.p.m. of the main shaft 4, or with the planet gear carrier 33, where-upon these shafts are locked together for direct drive (high range) of the output shaft 34. The gear ratio in the range gear set formed by the planetary gear set 31 is selected so that, when high range is engaged in the range gearbox, the first gear speed position in the basic gearbox will result in the fourth gear speed, the second gear speed position will provide the fifth gear speed and the third gear speed position will provide the sixth gear speed. This means that the fourth gear speed has the same gear lever position as the first gear speed, the fifth gear speed has the same position as the second gear speed, and the sixth gear speed has the same position as the third gear speed.

The gearbox has a neutral position lock generally designated 40 with double-lock functions, which will be described in more detail with reference to FIGS. 2a, 2b and 3. The neutral position lock comprises a cam element 41, which, in the example shown, is made in one piece with the shifting finger 20 on the control shaft 21 and which is consequently fixed relative to the control shaft. The cam element 41 is made with a V-shaped groove 42, which receives an end 43 of a lock bolt 44. The cam element 41 and the groove 42 have sufficient extent in the axial direction of the control shaft 21, that a portion of the groove 42 in the neutral position is always directly opposite the end of the lock bolt regardless of the lateral position of the control shaft 21. With the end 43 of the lock bolt inserted in the groove 42 of the cam element 41, the control shaft 21 is locked against rotation, which means that the basic gearbox selector lever (not shown) joined to the control shaft cannot be moved from the neutral position without great resistance.

The lock bolt 44 is solidly joined to a control piston 45 in a compressed air cylinder 46, the cylinder chambers 47, 48 of which are connected, on either side of the control piston 45 via pneumatic valves 49, 50, to a compressed-air circuit (not shown). A helical spring 51 in the cylinder chamber 48 biases the control piston 45 in the direction towards the cam element 41, and this means that the spring 51 will hold the end 43 of the lock bolt inserted in the cam groove 42, when the cylinder chambers 47, 48 are depressurized and the control shaft 21 is in the neutral position with the cam groove 42 lying directly opposite the lock bolt (FIG. 2b). As can be seen in the figures, the lock bolt 44 has bevelled end edges, which in combination with the V-shape of the groove 42 means that the control shaft 21 is not completely locked in this position. If sufficient force is applied to the shift lever (not shown), the control shaft can be turned pressing at the same time the lock bolt 44 out of the cam groove 42. This is, however, not normally required unless there is a pressure failure in the vehicle compressed-air circuit. The spring-biased lock bolt thus opposes the turning of the control shaft and increases the force which the driver must apply to the shift lever. This eliminates the risk of unintentional initiation of the synchronizing work.

Figure 2A:
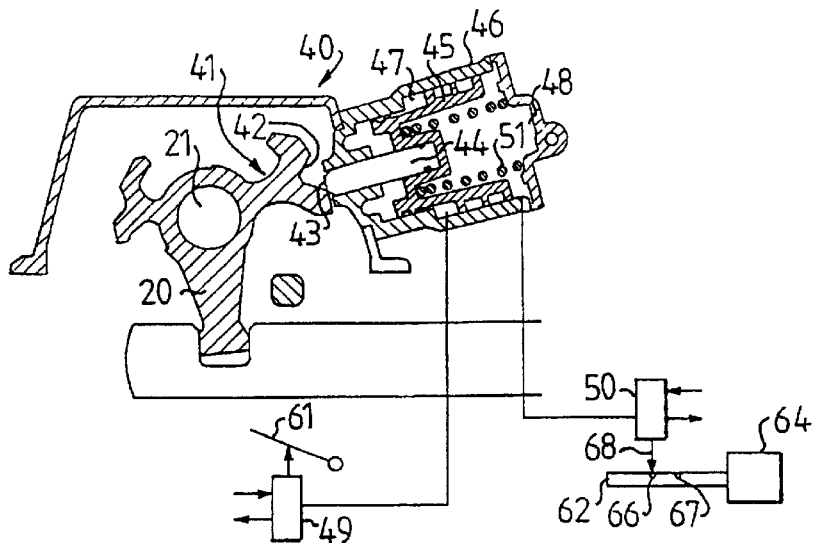
FIGS. 2a and 2b show cross-sections through a neutral position lock for the gearbox in FIG. 1 together with schematically represented control means.
Figure 2B:
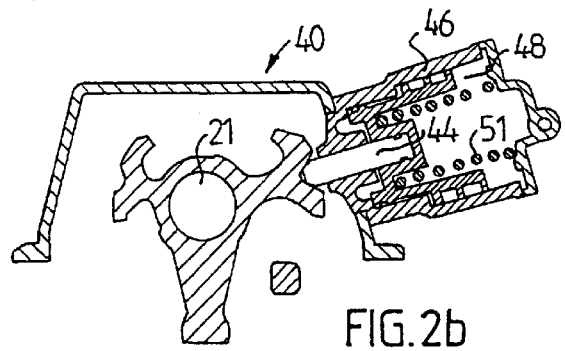
Figure 3:
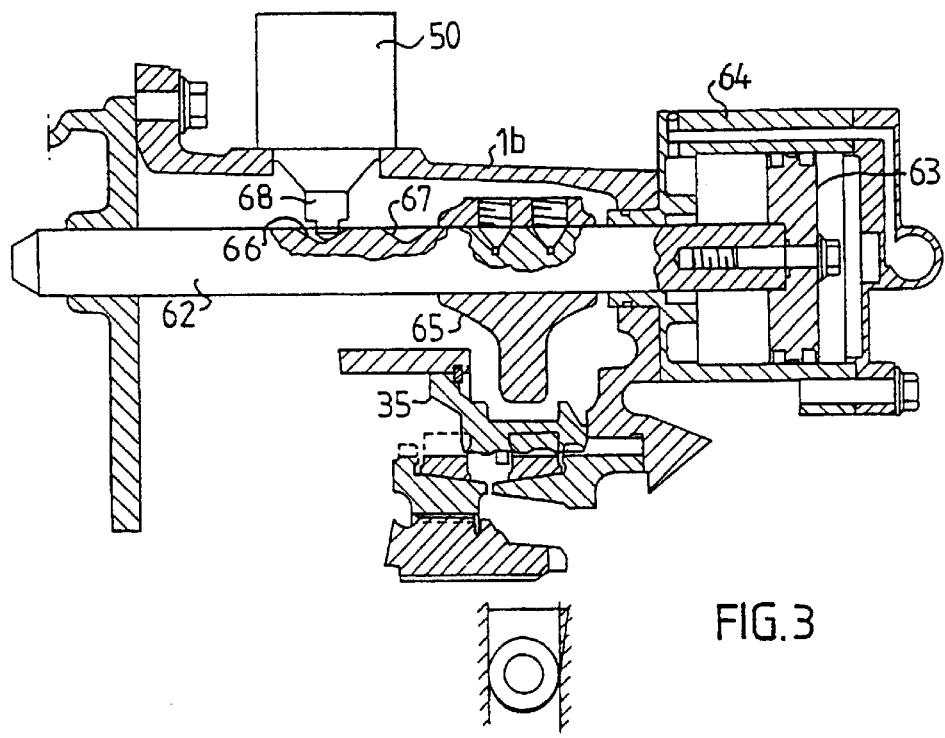
FIG. 3 shows a longitudinal section through a portion of the gearbox range mechanism comprising a control cylinder.

As is indicated schematically in FIG. 2a, the cylinder chamber 47 of the compressed-air cylinder 46 is connected to the vehicle compressed-air system via a valve 49, which is actuated by the movement of the vehicle clutch pedal 61. When the clutch pedal 61 is let up, the valve 49 depressurizes the cylinder chamber 47 and the lock bolt 44 is kept in the locked position by the spring, thus preventing unintentional shifting. When the clutch pedal 61 is depressed for intentional shifting, compressed air is supplied to the cylinder chamber 47. The piston area in the cylinder chamber 47 is selected so that the force on the piston exerted by the pressure is greater than the force of the spring 51, so that the lock bolt 44 is moved out of engagement with the cam element and shifting can be effected unimpeded by the neutral position lock.

As is also indicated schematically in FIG. 2a, the opposite cylinder chamber 48 of the compressed-air cylinder 46 can be supplied with compressed air via the valve 50. This valve is actuated mechanically by a piston rod 62 joined to a piston 63 in a compressed-air cylinder 64. The piston rod 62 is joined to a shift fork 65 engaging the engaging sleeve 35 of the range gearing (see FIG. 3). The piston rod 62 is made with a pair of depressions 66, 67, representing the two shift positions of the range gearing, i.e. low-range and high-range. When a sensor 68 cooperating with the valve 50 protrudes into one of the depressions 66 or 67, the valve 50 is in a position in which the cylinder chamber 48 of the cylinder 46 is depressurized. As soon as the piston rod 62 starts to be displaced to complete shifting in the range gearbox, the sensor 68 is pressed upwards, thereby opening the valve 50 and supplying compressed air to the cylinder chamber 48, so that the lock bolt 44 is moved to the locked position to lock the control shaft 21 in the neutral position even if the driver depresses the clutch pedal to shift the basic gearbox in connection with shifting in the range gearbox, thereby supplying compressed air at the same time to the opposite cylinder chamber 47 via the clutch controlled valve. This is because the sum of the spring force and the compressed-air force in the locking direction is greater than the compressed-air force in the opposite direction. In this manner, shifting in the basic gearbox is prevented prior to completed shifting in the range gearbox. As soon as the shifting in the range gearbox has been completed and the sensor 68 has reached one of the depressions 66 or 67, the cylinder chamber 48 of the lock cylinder 46 is depressurized and the lock bolt 44 is moved out of its locked engagement by the pressure in the cylinder chamber 47.

What is claimed is:

1. Vehicle gearbox, comprising:

an input shaft (2) mounted in a housing (1a);

at least one countershaft (3) driven by the input shaft (2);

a main shaft (4), pairwise inter-engaging gears (7, 12, 8, 13, 9, 14) supported by the countershaft and the main shaft, at least one gear (12, 13, 14) in each pair being freely rotatably mounted on its shaft and lockable to said shaft by means of an engaging sleeve (15, 16) axially displaceably but non-rotatably mounted on said shaft, said engaging sleeve being coordinated with synchronizing arrangements;

a shift control (21), the movement of which in one direction from a neutral position effects via motion transmitting elements (17, 18, 22, 23), displacement of an engaging sleeve (15) to an engagement position, and the movement of which from the neutral position in another direction effects displacement of another engaging sleeve (16) to an engagement position; and lock means (40) comprising a lock element (44) with control means (45, 46), which, during predetermined operating conditions, hold the lock element in a locked position, in which it impedes movement of the shift control;

wherein the control means (45, 46) of the lock element (44) comprise means (49) which are affected by the position of a clutch pedal (61) and which hold the lock element in the locked position when the clutch pedal is not actuated, characterized by means (42, 43) which moves the lock element (44) out of the locked position when the shift control (21) is loaded with a predetermined force.

2. Vehicle gearbox according to claim 1, characterized in that the shift control (21) is a control shaft rotatably and axially displaceably mounted perpendicular to said shafts (2,3,4), the rotational movement of said control shaft from the neutral position achieving, via the motion-transmitting elements (17,18,22,23), displacement of an engagement means (15) to an engagement position, the rotational movement of the control shaft from the neutral position in a second axial position effecting displacement of another engaging sleeve (16) to an engagement position.

3. Vehicle gearbox, comprising:

an input shaft (2) mounted in a housing (1a);

at least one countershaft (3) driven by the input shaft (2);

a main shaft (4), pairwise inter-engaging gears (7, 12, 8, 13, 9, 14) supported by the countershaft and the main shaft, at least one gear (12, 13, 14) in each pair being freely rotatably mounted on its shaft and lockable to said shaft by means of an engaging sleeve (15, 16) axially displaceably but non-rotatably mounted on said shaft, said engaging sleeve being coordinated with synchronizing arrangements;

a shift control (21), the movement of which in one direction from a neutral position effects via motion transmitting elements (17, 18, 22, 23), displacement of an engaging sleeve (15) to an engagement position, and the movement of which from the neutral position in another direction effects displacement of another engaging sleeve (16) to an engagement position; and lock means (40) comprising a lock element (44) with control means (45, 46), which, during predetermined operating conditions, hold the lock element in a locked position, in which it impedes movement of the shift control;

wherein the control means (45, 46) of the lock element (44) comprise means (49) which are affected by the position of a clutch pedal (61) and which hold the lock element in the locked position when the clutch pedal is not actuated, wherein means (42, 43) moves the lock element (44) out of the locked position when the shift control (21) is loaded with a predetermined force, wherein the control means of the locking element (44) comprise a piston cylinder device (45, 46) connected to a source of pressure medium, the piston (45) of said device being biased by spring means (51) towards a position in which the locking element is in the locked position.

4. Vehicle gearbox according to claim 3, characterized in that the locking element is a piston rod (44) with an end (43) protruding from the cylinder (46), said end being received in a groove (42) in an element (41) solidly joined to the control shaft.

5. Vehicle gearbox according to claim 4, characterized in that the end (43) of the locking element and the groove (42) in the element (41) solidly joined to the control shaft (21) are formed so that, if a certain torque is applied to the control shaft, the control shaft will be turned, pressing the end of the locking element out of the groove.

6. Vehicle gearbox according to claim 3, characterized in that the main shaft (4) drives the sun gear (30) in a planetary gear set, the planetary gear carrier (33) of which is joined to an output shaft (30) and the ring gear (36) of which is lockable, by means of an engaging sleeve (35), to the housing or to the planetary gear carrier, the engaging sleeve being coordinated with a sensor (68), which, during movement of the engaging sleeve, sends a signal to the control means to keep the locking element (44) in the locked position.

7. Vehicle gearbox according to claim 6, characterized in that the piston-cylinder device is double-acting with one cylinder chamber (47,48) on either side of the piston and that spring means (51) are disposed between a cylinder wall and a piston end in one cylinder chamber (48), while the locking element (44) is joined to the piston on the opposite side, the cylinder diameter being selected so that the force acting on the piston by the pressure medium is greater than the opposite force of the spring on the piston.

* * * * *